US012757302B2

(12) United States Patent
Encinas Gomar et al.

(10) Patent No.: US 12,757,302 B2
(45) Date of Patent: Oct. 6, 2026

(54) ENERGY SUPPLY FOR A LIGHT HAVING A MATRIX OF LEDS, IN PARTICULAR AN LED MOTOR VEHICLE HEADLIGHT

(71) Applicant: HELLA GMBH & CO. KGAA, Lippstadt (DE)

(72) Inventors: Alberto Encinas Gomar, Lippstadt (DE); Oliver Hetzel, Rüthen (DE); Ingo Möllers, Rietberg (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 15 days.

(21) Appl. No.: 18/969,797

(22) Filed: Dec. 5, 2024

(65) Prior Publication Data

US 2025/0098049 A1 Mar. 20, 2025

Related U.S. Application Data

(63) Continuation of application No. PCT/EP2023/065182, filed on Jun. 7, 2023.

(30) Foreign Application Priority Data

Jun. 27, 2022 (DE) ......................... 102022115951.5

(51) Int. Cl.
*H05B 45/34* (2020.01)
*B60Q 1/04* (2006.01)

(52) U.S. Cl.
CPC ............... *H05B 45/34* (2020.01); *B60Q 1/04* (2013.01)

(58) Field of Classification Search
CPC ...... H05B 45/34; H05B 45/18; H05B 45/347; H05B 47/14; B60Q 1/04
See application file for complete search history.

(56) References Cited

U.S. PATENT DOCUMENTS

| | | | | |
|---|---|---|---|---|
| 9,578,701 | B1 * | 2/2017 | Logiudice | H05B 45/48 |
| 2020/0084853 | A1 | 3/2020 | Bonne et al. | |
| 2022/0272804 | A1 * | 8/2022 | Hsieh | H05B 45/14 |

FOREIGN PATENT DOCUMENTS

| | | | | |
|---|---|---|---|---|
| DE | 102018120283 | A1 * | 3/2019 | G01S 17/894 |
| DE | 102020106270 | A1 | 9/2021 | |

(Continued)

OTHER PUBLICATIONS

Search Report of the International Searching Authority for Application No. PCT/EP2023/065182, mailed Jul. 25, 2023 (4 pages).

*Primary Examiner* — Abdullah A Riyami
*Assistant Examiner* — Syed M Kaiser
(74) *Attorney, Agent, or Firm* — WARNER NORCROSS + JUDD LLP

(57) ABSTRACT

A circuit arrangement for a light having: an input for connection to a supply network; an adjustable voltage source, an input of the voltage source; a matrix of LEDs connected to the output of the voltage source; and a control unit to which the control connection of the voltage source is connected. The circuit arrangement has series circuits including at least one LED and one adjustable current source. The series circuits are connected in parallel, thus forming the matrix. The voltage source adjusts its output voltage to the setpoint voltage value provided by the control connection by the control unit. The control unit has an input for reading in: status information about the temperature in the matrix; measurement values for temperatures of the LEDs; measurement values for the voltages across the current sources; measurement values for the voltage across the matrix; and measurement values for the voltages at the LEDs.

6 Claims, 1 Drawing Sheet

(56) References Cited

FOREIGN PATENT DOCUMENTS

| | | | | | |
|---|---|---|---|---|---|
| EP | 3672370 | A1 * | 6/2020 | ............. | H05B 45/48 |
| WO | 2009000475 | A2 | 12/2008 | | |
| WO | WO-2015059675 | A1 * | 4/2015 | ............ | F21S 41/153 |
| WO | 2019091843 | A1 | 5/2019 | | |
| WO | WO-2021108735 | A1 * | 6/2021 | ............. | H05B 45/44 |

* cited by examiner

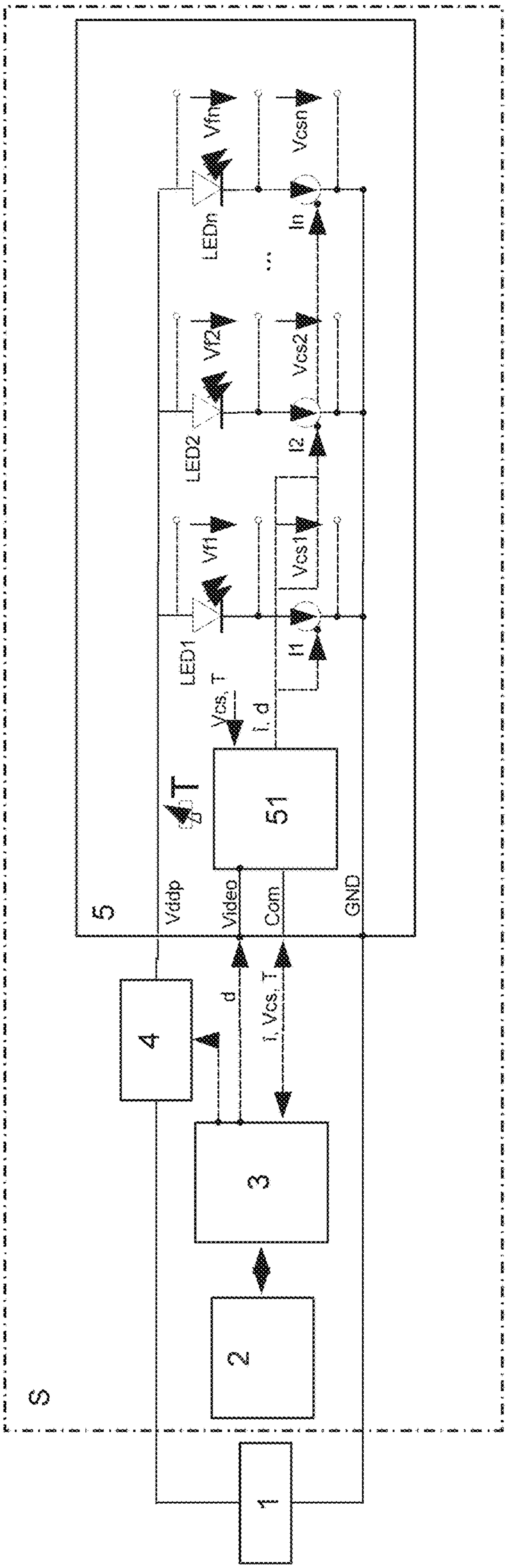
S
1
2
3
4
5
51
Vddp
Video
Com
GND
d
I, Vcs, T
Vcs, T
I, d
T
LED1
LED2
LEDn
Vf1
Vf2
Vfn
Vcs1
Vcs2
Vcsn
I1
I2
In

ENERGY SUPPLY FOR A LIGHT HAVING A MATRIX OF LEDS, IN PARTICULAR AN LED MOTOR VEHICLE HEADLIGHT

CROSS-REFERENCE TO RELATED APPLICATIONS

The present application is a continuation of International Application No. PCT/EP2023/065182, filed Jun. 7, 2023, which claims priority to German Patent Application 10-2022-115-951.5, filed Jun. 27, 2022, the disclosures of which are incorporated by reference.

FIELD OF THE INVENTION

The invention relates to a circuit arrangement for a light, in particular an LED motor vehicle headlight, having an input for connection to a supply network, for example a vehicle on-board power network;

- having an adjustable voltage source, the voltage source having an input, an output and a control connection, and the input being connected to the input of the circuit arrangement;
- having a matrix of LEDs which is connected to the output of the voltage source; and
- having a control unit to which the control connection of the adjustable voltage source is connected;
- wherein the circuit arrangement has series circuits including at least one LED and one adjustable current source with which the current through the series circuit can be adjusted;
- wherein the series circuits are connected in parallel and the series circuits connected in parallel form the matrix; and
- wherein the voltage source is configured to adjust its output voltage to the voltage value provided by the control unit at the control connection.

BACKGROUND OF THE INVENTION

LED matrix circuit arrangements are often used in car headlights to create different light patterns and light settings. These LED matrix circuit arrangements are connected to one or more external supply voltage sources and have at least one adjustable voltage source, a control unit and a plurality of current sources connected in series with the LEDs. The series circuits form the LED matrix. The level of the supply voltage provided by the voltage source is controlled by the control unit. The control unit is used to determine the duty cycles for each series circuit in order to be able to dim the currents through the series circuits by means of pulse width modulation using the current sources. The duty cycles can be transmitted to the current sources, which then set the appropriate current for dimming.

In the known LED matrix circuit arrangements, the supply voltage is set such that all series circuits are provided with sufficient voltage to achieve the current required to generate the desired light at the desired current level. To ensure that this target, the desired current level, is safely achieved, the voltage source usually provides a supply voltage that is high enough to ensure that the desired current levels are achieved. Up to now, when using this type of LED matrix circuit arrangements having current sources in series with the LEDs, insufficient attention has been paid to ensuring that the current sources are only supplied with the minimum voltage necessary to achieve the desired current levels. This results in high power losses in the voltage source, the LEDs, the current sources and the associated components. The self-heating of the electronic components is high and the LEDs are therefore in a warm environment. Higher LED temperatures result in lower luminous efficacy, which may need to be compensated for by dimming the LED less to produce more light.

There is also currently no optimization of the power loss in the power sources. Complex cooling concepts are developed and implemented to prevent excessive heating of the circuit components. It may also be necessary to use particularly high-quality components, which would not be necessary for other reasons.

This is where the invention comes in. The technical problem underlying the invention is to minimize heat generation during light production.

SUMMARY OF THE INVENTION

According to the invention, this object is achieved by the control unit having an input:

- for reading in status information about the temperature in or at the matrix, wherein these temperatures can be assigned to individual LEDs;
- for reading in measurement values of the temperatures of the individual LEDs;
- for reading in measurement values of the voltages across the current sources of each series circuit;
- for reading in measurement values of the voltage across the matrix and the voltages at the LEDs of each series circuit; and/or
- for reading in measurement values of the current through each series circuit; and that the control unit is suitable:
- to determine a setpoint voltage value from the read-in status information or the read-in status information, the read-in measurement values of the temperatures, the voltages and/or the currents, which can be provided at the control connection so that the adjustable voltage source adjusts to this voltage value; and/or
- to determine target amplitudes of the currents through the series circuits from a read-in status information or the read-in status information, read-in measurement values of the temperatures, voltages and/or currents so that the current sources set currents with these amplitudes.

By evaluating status information, such as the temperature of the LED (high/medium/low) or voltage across the current source or the LED (forward voltage, high/medium/low) or measurement values, in particular the temperature or voltage across the current source, the forward voltage or the voltage across the series circuit, it is possible to optimize the settings for the current sources in each series circuit. The voltage across the current source and the currents set by the current sources can be reduced further than is the case with the state of the art. Heat generation that is unnecessary for the production of light can be avoided.

New LED matrix components on the market provide status information of the LED current source voltages or even the measurement values. These make it possible to optimize the status information and/or the measurement values for optimizing the voltage and currents provided by the voltage source through the series circuits applied to the LED matrix. By optimizing the voltage at the output of the voltage source and reducing the currents in the series circuits compared to conventional circuit arrangements, it is also possible to reduce the voltages across the current sources. By reducing the current source voltages to an absolute minimum, lower power losses can be achieved in the voltage source and current source. As a result, less self-heating of these electronic components is achieved and the LEDs operate in a cooler environment, which leads to a higher luminous efficacy.

The circuit arrangement can also have an input or a video data interface for reading in the target brightness distribution or video data from a communication network.

For measuring the temperature, the voltages or a current, a circuit arrangement according to the invention can have temperature sensors, voltage sensors and/or current sensors for determining the measurement values. Then it is not necessary to use external sensors that provide these measurement values.

Current-voltage characteristic curves of the current sources and/or current-voltage characteristic curves of the LEDs for different temperatures can be stored in the control unit of a circuit arrangement according to the invention. According to the invention, it is possible to determine the setpoint voltage value as a function of the measurement values and the characteristic curves or one of the characteristic curves. With a known temperature and known measurement values for the voltages at the current sources and/or for the forward voltages or the voltages across the series circuits or the current through the series circuits, the optimum operating points for the current sources can thus be determined. By considering the optimum operating points of all current sources, an optimum voltage of the voltage source and an optimum current of the current sources supplying the series circuit with the voltage can then be determined.

According to the invention, the characteristic curves of the LEDs and/or the current sources can be individually determined beforehand and stored in the control unit, in particular as a look-up table.

According to the invention, to determine the optimum setpoint voltage value of the voltage source, it is possible, for example, that using the control unit:

- for each series circuit, the current through the series circuit required to operate the LED, in particular to generate the desired light by the LED, can be determined;
- for each series circuit, the voltage required to generate the necessary current through the series circuit can be determined via the current source using the characteristic curves for the current source of this series circuit stored in the control unit;
- for each series circuit, the forward voltage can be determined using the characteristic curves for the LEDs stored in the control unit from the temperature of the LED or in the area of the LED and the necessary current through the series circuits;
- for each series circuit, the sum of the required voltage and the forward voltage can be determined; and
- the voltages determined in this manner are compared using the control unit and the largest sum can be used as the setpoint voltage value.

In a circuit arrangement according to the invention, the control unit can be configured such that:

- if all voltages across the current sources are above a first predetermined value, the setpoint voltage value is reduced by a predetermined amount; and
- if a voltage across the current sources is below the first predetermined value, the setpoint voltage value is increased by a predetermined amount;
- and that these steps are repeated until all voltages across the current sources are not less than the first predetermined value and the lowest of the voltages across the current sources is less than the predetermined amount higher than the first predetermined value.

According to the invention, the circuit arrangement can comprise an integrated circuit, for example an application-specific integrated circuit (ASIC), connected between the control unit and the sensors. According to the invention, this integrated circuit can take over the functions of the control unit described above.

According to the invention, it is possible that the control unit or integrated circuit is adapted to determine a duty cycle for the current sources of each series circuit in order to dim the LEDs by pulse width modulating the current through the series circuit.

BRIEF DESCRIPTION OF THE DRAWING

An embodiment example of a circuit arrangement for a light according to the invention is described in more detail below with reference to the drawing. In the drawing:

FIG. 1 shows a simplified circuit diagram of the circuit arrangement according to the invention.

DETAILED DESCRIPTION OF THE CURRENT EMBODIMENT

The circuit arrangement S is intended for a motor vehicle headlight. It has an input for connection to a vehicle on-board power network 1, in which various sources of electrical energy can be provided, for example batteries or generators. The circuit arrangement S has an adjustable (controlled) voltage source 4. Said voltage source is controlled by a control unit 3. The control unit supplies the voltage source 4 with a setpoint voltage value to which the voltage source adjusts. The voltage source then provides a voltage Vddp. The circuit arrangement also has a video data interface (not shown), via which the control unit 3 can read in brightness values or video data.

The control unit 3 is connected to a memory 2 in which characteristic curves and voltage values are stored and which can be read out from the memory 2 by the control unit 3.

The circuit arrangement further has a lighting unit 5 which is composed of a plurality of components. For example, the lighting unit has an LED matrix being formed of a plurality of series circuits connected in parallel. Each series circuit has at least one light-emitting diode LED1, LED2, . . . , LEDn and an adjustable current source I1, I2, . . . , In connected in series. A forward voltage Vf1, Vf2, . . . , Vfn drops across the light-emitting diodes LED1, LED2, . . . , LEDn and a voltage Vcs1, Vcs2, . . . , Vcsn drops across the current sources I1, I2, . . . , In. The sum of the forward voltage of one of the LEDs and the voltage across the current source of the same series circuit corresponds to the voltage Vddp provided by the voltage source 4.

The controlled current sources I1, I2, . . . , In can be used to set the current through the series circuits and thus through the light-emitting diodes LED1, LED2, . . . , LEDn. On the one hand, the peak value $\hat{i}$ but also the average current, which results from a pulse width modulation of the current, can be set. Both the peak value $\hat{i}$ and a duty cycle d are specified for the current sources I1, I2, . . . , In by the control unit. Both values are decisive for the light emitted by the light-emitting diodes LED1, LED2, . . . , LEDn, among other things for the color of the light and the brightness of the light.

The peak values $\hat{i}$ and the duty cycles d for the current sources I1, I2, . . . , In are determined by the control unit 3. The brightness or the duty cycle d is part of a video signal that is generated by the control unit 3. The duty cycle d is coded in the video signal. Said video signal is transmitted by the control unit 3 to an ASIC 51 of the lighting unit, which decodes the duty cycles d from the video signal and converts them into control instructions for the current sources I1, I2, . . . , In, which are transmitted to the current sources I1, I2, . . . , In. The peak values î of the currents through the series circuits or light-emitting diodes LED1, LED2, . . . , LEDn are transmitted via a communication channel Com by the control unit 3 to the ASIC 51, which uses them to generate control instructions for the current sources I1, I2, . . . , In, which are transmitted to the current sources I1, I2, . . . , In.

The lighting unit 5 has temperature sensors that can be used to measure the temperatures in the area of each of the light-emitting diodes LED1, LED2, . . . , LEDn. These measurement values T for the temperature are representative of the temperature of the light-emitting diodes LED1, LED2, . . . , LEDn. The measured temperatures T are supplied by the temperature sensors to the ASIC, which then forwards the values to the control unit via the communication channel Com.

The lighting unit also has voltage sensors that determine the voltage across the current sources. These measurement values Vcs1, Vcs2, . . . , Vcsn or optionally Vf1, Vf2, . . . , Vfn are also transmitted to the ASIC, which forwards the measurement values Vcs1, Vcs2, . . . , Vcsn or optionally Vf1, Vf2, . . . , Vfn to the control unit 3 via the communication channel com.

Using the measurement values T for the temperatures of the light-emitting diodes and the measurement values for the voltage across the current sources, the voltage Vddp at the output of the voltage source 4 can now be optimized and the optimized setpoint values for the amplitudes î of the currents through the series circuits can be provided at the Com interface, in particular can be reduced to the minimum necessary value, so that the voltage across the current sources I1, I2, . . . , In is as low as necessary so that as little power as necessary has to be converted by the current sources, light-emitting diodes and the voltage supply.

To optimize the voltage Vddp, the control unit uses characteristic curves of the light-emitting diodes and characteristic curves of the current sources, which are stored in memory 2. These can be individual characteristic curves that are determined for the components used or characteristic curves that are provided by manufacturers for the types of components used. The characteristic curves can either be stored as equations in the memory. However, it is easier to store tables in memory 2 and, if necessary, to interpolate missing values in the tables. Temperature-dependent characteristic curves and tables are also possible, in particular for the light-emitting diodes LED1, LED2, . . . , LEDn and the current sources.

To determine the optimum setpoint voltage value for the voltage Vddp, the control unit can first be used to determine for each series circuit the current through the series circuit required to operate the light-emitting diodes LED1, LED2, . . . , LEDn with which the light-emitting diodes LED1, LED2, . . . , LEDn generates the desired light. In particular, the peak value î and the duty cycle d are determined. The current or the amplitudes î of the currents through the series circuits are calculated from the desired brightnesses, which are read in via the input video data from the control unit 3 via the vehicle 1 and the measurement values T provided by the ASIC 51 for the temperatures of the light-emitting diodes LED1, LED2, . . . , LEDn.

For each series circuit, the voltage Vcs1, Vcs2, . . . , Vcsn across the current sources required to generate the necessary current through the series circuit is then determined using the characteristic curves for the current source I1, I2, . . . , In. For each series circuit, the forward voltage Vf1, Vf2, . . . , Vfn across the light-emitting diodes LEDs LED1, LED2, . . . , LEDn is then determined using the characteristic curves for the light-emitting diodes LED1, LED2, . . . , LEDn from the temperature T of the light-emitting diodes LED1, LED2, . . . , LEDn and the required current through the series circuits. For each series circuit, the sum of the required voltage Vcs1, Vcs2, . . . , Vcsn across the current source I1, I2, . . . , In and the forward voltage Vf1, Vf2, . . . , Vfn can then be formed. If exactly the sum of the two voltages is applied to the series circuit, an optimum operating point would be reached. However, as all series circuits are supplied with the same voltage Vddp, the sums determined in this way are compared using the control unit and the largest sum is used as the setpoint voltage value. This then ensures that all series circuits are supplied with sufficient voltage and that all current sources are operated as close as possible to their optimum operating point.

LIST OF REFERENCE NUMERALS

S circuit arrangement
1 on-board power network
2 memory
3 control unit
4 voltage source
5 lighting unit
51 ASIC
LED1, LED2, . . . , LEDn light-emitting diodes
I1, I2, . . . , In power sources
Vddp voltage at the output of the voltage source
Vf1, Vf2, . . . , Vfn forward voltages of the light-emitting diodes
Vcs1, Vcs2, . . . , Vcsn voltages across the power sources
T temperature on the light-emitting diodes
î amplitude of the current through the series circuits
d duty cycle The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A circuit arrangement for an LED motor vehicle headlight, comprising:

an input for connection to a supply network;

an adjustable voltage source, the adjustable voltage source having an input, an output, and a control connection, and the input of the adjustable voltage source being connected to the input of the circuit arrangement;

a matrix of light-emitting diodes connected to the output of the adjustable voltage source; and a control unit to which the control connection of the adjustable voltage source is connected;

wherein the circuit arrangement includes a plurality of series circuits, wherein each of the plurality of series circuits includes one of the light-emitting diodes and an adjustable current source through which a current through the corresponding series circuit can be adjusted;

wherein each of the plurality of series circuits are connected in parallel with each other to form the matrix of light-emitting diodes; and wherein the adjustable voltage source is configured to adjust its output voltage to a setpoint voltage provided by the control unit at the control connection;

wherein the control unit has an input:

for reading in status information about temperatures in or at the matrix of light emitting diodes, wherein the temperatures assigned to individual ones of the light-emitting diodes of the matrix of light emitting diodes, for reading in measurement values of temperatures of individual ones of the light-emitting diodes of the matrix of light-emitting diodes, for reading in measurement values of a voltages across the adjustable current source of each of the plurality of series circuit, for reading in measurement values of a voltage across the matrix or across the light-emitting diode of each series circuit, or for reading in measurement values of a current through each of the plurality of series circuits; and wherein the control unit is configured to:

determine the setpoint voltage from the read-in status information, from the read-in measurement values of a temperatures, from the read-in measurement values of a voltage, or from the measurement values of a current, which are provided at the control connection, so that the adjustable voltage source adjusts to the setpoint voltage, determine, for each light-emitting diode, a target current from the read-in status information, from the read-in measurement values of a temperature, from the read-in measurement values of a voltage, or from the measurement values of a current, so that each adjustable current source adjusts to the corresponding target current as determined by the control unit, determine a forward voltage for each light-emitting diode using the target current and a current-voltage characteristic curve for the respective light-emitting diode, determine a voltage across each adjustable current source using the target current and a current-voltage characteristic curve for the respective adjustable current source, determine, for each of the plurality of series circuits, a sum of the forward voltage of the corresponding light-emitting diode and the voltage across the corresponding adjustable current source, and select the largest sum among the plurality of series circuits as a modified setpoint voltage for the adjustable voltage source.

2. The circuit arrangement of claim 1, wherein the circuit arrangement includes a plurality of temperature sensors, voltage sensors, or current sensors.

3. The circuit arrangement of claim 1, wherein the current-voltage characteristic curves of each adjustable current source and the current-voltage characteristic curves of the plurality of light emitting diodes are stored in the control unit as a look-up table.

4. The circuit arrangement of claim 1, wherein the control unit is configured such that, if all measurement values of the voltages across the current sources are above a first predetermined value, the setpoint voltage is reduced by a first predetermined amount, and if at least one measurement value of the voltages across the current sources is below the first predetermined value, the setpoint value is increased by a second predetermined amount, and that these steps are repeated until all measurement values of the voltages across the current sources are not below the first predetermined value.

5. The circuit arrangement of claim 2, wherein the circuit arrangement has an integrated circuit connected between the control unit and the plurality of temperature sensors, voltage sensors, or current sensors.

6. The circuit arrangement of claim 5, wherein the control unit or the integrated circuit is adapted to determine a duty cycle for each adjustable current source of the plurality of series circuits in order to dim the light-emitting diodes of the plurality of series circuits.

* * * * *